Patented Mar. 17, 1953

2,632,026

UNITED STATES PATENT OFFICE 2,632,026

OXIDATION OF AROMATIC HYDROCARBONS

Joshua C. Conner, Jr., Wilmington, Del., assignor to Hercules Powder Company, Wilmington, Del., a corporation of Delaware No Drawing. Application February 18, 1950, Serial No. 145,091

9 Claims. (Cl. 260—610)

This invention relates to a process for oxidizing an alkyl-substituted aromatic organic compound having the structural formula

in which $R_1$ and $R_2$ represent alkyl groups and Ar represents either an aryl group or an alkaryl group. More particularly, the invention relates to a process for the oxidation of compounds such as cumene in the liquid phase by means of molecular oxygen.

It is known that cumene, for example, may be oxidized in the liquid phase by means of molecular oxygen, but none of the processes heretofore disclosed for the oxidation of cumene have resulted in substantial yields of $\alpha,\alpha$-dimethylbenzyl hydroperoxide. Under the conditions practiced in prior procedures, difficulties are encountered in initiating the reaction and the $\alpha,\alpha$-dimethylbenzyl hydroperoxide has not been obtained in substantial yields as the major product by the oxidation of cumene. The oxidation has, instead, led to mixtures containing preponderant amounts of acetophenone and small amounts of $\alpha,\alpha$-dimethylbenzyl alcohol.

Now in accordance with this invention, it has been discovered that tertiary hydroperoxides having the structural formula

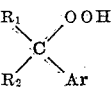

may be prepared by contacting an alkyl-substituted aromatic organic compound having the structural formula previously described in the liquid phase at a temperature in excess of 20° C. with an oxygen-containing gas in the presence of gaseous ammonia, the ammonia acting catalytically as an initiator for the reaction. In the structural formula of the hydroperoxides, $R_1$ and $R_2$ represent alkyl groups which may be either the same or different and Ar represents a substituent selected from the group consisting of aryl and alkaryl groups. These tertiary hydroperoxides may be referred to as $\alpha,\alpha$-dialkylarylmethyl hydroperoxides or, if desired, as aryl-(dialkyl)methyl hydroperoxides. Thus, the hydroperoxide derived from cumene in accordance with the process of this invention may be named $\alpha,\alpha$-dimethylbenzyl hydroperoxide, or, if desired, phenyl(dimethyl)methyl hydroperoxide.

The process of this invention may be practiced, for example, by vigorously agitating a mixture of cumene at a temperature in excess of 20° C. while simultaneously passing a stream of an oxygen-containing gas containing gaseous ammonia in catalytic amounts through the reaction mixture. The reaction is continued until standard analytical data, such as refractive index, indicate the conversion of from about 10% to about 70% of the original cumene to oxygenated products. The reaction mixture may then be treated in accordance with known techniques to obtain a product containing preponderant amounts of $\alpha,\alpha$-dimethylbenzyl hydroperoxide.

Having thus described the invention, the following examples are specific embodiments thereof. All parts are parts by weight unless otherwise indicated.

EXAMPLE 1

A glass reaction vessel equipped with a reflux condenser, a high speed stirrer and an oxygen inlet was charged with 400 parts of cumene. Twelve and three-tenths parts of oxidized cumene containing 97.8% of $\alpha,\alpha$-dimethylbenzyl hydroperoxide was added to the charge as a reaction initiator. Oxygen containing 0.26% gaseous ammonia was passed through the reaction mixture at the rate of 15 liters per hour per kilogram of cumene. A temperature of 90° C. was maintained throughout the reaction period, which extended for 51.0 hours. Table I shows the data for the oxidation.

Table I

| Time (Hr.) | $n_D^{20}$ | Oxidation Products in Product (Percent) | | Rate of Oxidation (Percent/Hr.) |
|---|---|---|---|---|
| | | Total | Hydroperoxide | |
| 20.6 | 1.4956 | 15.7 | 14.8 | 0.62 |
| 28.7 | 1.4970 | 20.5 | 19.6 | 0.61 |
| 44.6 | 1.4990 | 27.4 | 26.9 | 0.55 |
| 51.0 | 1.5002 | 30.0 | 28.9 | 0.53 |

During the oxidation the effluent oxygen gas contained a substantial amount of ammonia. Upon completion of the oxidation, the pH determined on distilled water after shaking with the organic phase was 9.3 showing the presence of excess ammonia, and the crude amber reaction product amounted to 350 parts. Analysis of the reaction product indicated the presence of 28.9% $\alpha,\alpha$-dimethylbenzyl hydroperoxide, 70% unreacted cumene, 0.90% $\alpha,\alpha$-dimethylbenzyl alcohol, and 0.22% acetophenone. Based on the amount of the $\alpha,\alpha$-dimethylbenzyl hydroperoxide initiator and the amount of each of the reaction products expressed in terms of cumene, the recovery of the components making up the reaction product amounted to 90.6%. The yield of α,α-dimethylbenzyl hydroperoxide was 95.5% of the theoretical amount based on the cumene, taking into consideration that the conversion at 51.0 hours was 30.0%. The conversion of 30.0% represents conversion to total oxygenated products.

EXAMPLE 2

The same equipment and the same conditions of temperature and oxygen flow as those described in Example 1 were again utilized. In this case, however, the oxygen contained 1% gaseous ammonia. At the end of 22.8 hours of reaction, a sample of the oxidized product had a refractive index at 20° C. of 1.4945, thus indicating a conversion of the cumene to 12.0% oxygenated products. The per cent α,α-dimethylbenzyl hydroperoxide at this time was 11.4%. At the end of 44.8 hours the reaction was terminated. At this time the refractive index of the reaction product was 1.4981, thus indicating a total conversion of 24.6% and the hydroperoxide content was 24.0. The pH determined on distilled water after shaking with the organic phase was 8.6. Analysis of the reaction product indicated that a yield of 97.1% of α,α-dimethylbenzyl hydroperoxide had been obtained based on the cumene utilized and the percentage total conversion. Calculations showed that the per cent recovery was 96.2. The product also contained 0.47% α,α-dimethylbenzyl alcohol and 0.11% acetophenone.

EXAMPLE 3

The same equipment and the same conditions of temperature and oxygen input as those described in Example 1 were again utilized. In this case, however, p-cymene was oxidized, the amount of this compound charged to the reactor being 400 parts. At the beginning of the oxidation the mixture also was charged with 17.5 parts of oxidized cymene containing 68.4% α,α-dimethyl-p-methylbenzyl hydroperoxide as initiator. The oxidation reaction was carried out as in Example 1 and continued for 47.9 hours. At the end of this time the reaction product showed a content of 15.7% α,α-dimethyl-p-methylbenzyl hydroperoxide, 1.51% α,α-dimethyl-p-methylbenzyl alcohol, and 0.66% p-methyl acetophenone.

EXAMPLE 4

A charge of 53 lb. cumene containing 1.45 lb. 96.1% α,α-dimethylbenzyl hydroperoxide was placed in a steam heated stainless steel tower 20 feet high and 3 inches in inside diameter. Air containing 1% gaseous ammonia by volume was pumped into the tower through a pipe fitted with a sintered stainless steel dispersion disk in the bottom of the tower while maintaining a temperature of 120° C. in the tower. The pressure in the tower was maintained at 80 p. s. i. (gauge) by slowly bleeding off the exhaust gases at the top of the tower. The rate of input of air containing 1% ammonia was 0.7–1.0 cu. ft. per minute. After an 8-hour oxidation period, a sample was withdrawn. It analyzed 30% α,α-dimethylbenzyl hydroperoxide.

While continuing to pass air containing 1% gaseous ammonia into the tower at a rate of 0.7–1.0 cu. ft. per minute, cumene was simultaneously added slowly to the charge in the tower through a pipe at the top of the tower at a rate of 6.1 lb. per hour while oxidized cumene containing α,α-dimethylbenzyl hydroperoxide was withdrawn through a valve at the bottom of the tower adjacent the air inlet. A sample taken at the end of 16 hours after the continuous withdrawal of product had continued 8 hours showed 26.8% α,α-dimethylbenzyl hydroperoxide. During this period the ammonia content of the air entering the tower was 1.24% by volume and that of the air leaving the tower was 0.78% by volume.

During the next 8-hour period the cumene flow rate was 7.2 lb. per hour and the ammonia content of the air entering the tower was 1.06% by volume while that leaving the tower was 0.29% by volume. The rate of air flow was 0.7–1.0 cu. ft. per minute as in the previous periods. At the end of this 8-hour period the product being withdrawn at the same rate as the cumene being introduced analyzed 23.1% α,α-dimethylbenzyl hydroperoxide. Further analysis of this product showed that α,α-dimethylbenzyl hydroperoxide constituted 89.1% of the total oxidation products in the crude product.

During the next 8-hour period the cumene flow rate averaged 6.5 lb. per hour, the air flow rate varied from 0.7 to 1.0 cu. ft. per minute and the ammonia content of the air entering the tower was about 0.83% by volume, while that of the air leaving the tower was about 0.30% by volume. The α,α-dimethylbenzyl hydroperoxide content of the product continuously being withdrawn averaged 23.7%.

The examples have set forth the use of cumene and p-cymene as compounds which may be treated in accordance with the process of this invention. Other compounds, however, having the structural formula previously set forth such as diisopropylbenzene may be utilized. The primary requirement for compounds which may be oxidized in accordance with this invention is the presence of a tertiary carbon atom, the fourth valence bond of which is satisfied by a hydrogen atom. As indicated by the structural formula, the carbon atom is tertiary because it is directly connected to three other carbon atoms one of which is contained in each of the groups represented by $R_1$ and $R_2$ and Ar.

The aryl or alkaryl group need not be derived from benzene as in the case of cumene, p-cymene, and p-diisopropylbenzene. Other compounds containing aromatic nuclei, such as those derived from naphthalene, anthracene, and phenanthrene, which otherwise meet the requirements of the structural formula, are also operable. However, such compounds, if solids, must be dissolved in a suitable solvent such as benzene during the liquid phase oxidation reaction. Furthermore, the aryl group may be substituted with alkyl groups such as methyl, ethyl, propyl, isopropyl, butyl, isobutyl, sec-butyl, tert-butyl, and the like. The alkyl groups represented by $R_1$ and $R_2$ in the structural formula need not be limited to methyl groups as in the case of cumene, p-cymene, and p-diisopropylbenzene. Other alkyl groups such as those indicated as suitable substituents for the aryl groups may be utilized. Furthermore, $R_1$ and $R_2$ may be either the same or different.

The examples have illustrated the use of air and molecular oxygen as the oxygen-containing gas which may be utilized in accordance with the process of this invention. The oxygen, however, may be furnished in the form of mixtures of molecular oxygen with nitrogen or other inert gases. Oxygen, when used alone, may be either a commercial or chemically pure product. Air may be utilized either with or without partial or complete dehumidification. The amount of oxygen in the oxygen-containing gas is preferably at least about 10% of the gas. The rate of input of the oxygen-containing gas may vary within a wide range, depending upon the concentration of oxygen in the gases, the pressure at which the oxidation is carried out and the efficiency of dispersion. At pressures of from 50 to 200 p. s. i., for example, the rate of input may be from about 2 to about 200 liters of oxygen/hr./kg. of alkaryl compound. A preferable range is from about 20 to about 60 liters of oxygen/hr./kg. At atmospheric pressure the rate of input may, in general, vary from about 1 to about 100 liters/hr./kg. of alkyl compound, a preferable range being from about 5 to about 25 liters/hr./kg.

Since the reaction is heterogeneous, suitable agitation is necessary. It is particularly important to bring the air, oxygen, or other oxygen-containing gas into intimate contact with the liquid phase, and this may be effected by using high speed stirrers, suitable nozzles, porous plates or their combinations. This may suitably involve also recirculation of the oxygen-containing gas.

The oxygen is contacted with the alkyl-substituted aromatic organic compound until the desired amount of hydroperoxide is formed. In general, at least about 5% hydroperoxide formation will be desired. This will require approximately 1.3 parts oxygen per 100 parts alkyl-substituted aromatic organic compound. Under these conditions it will be preferable to use at least about 0.006 part gaseous ammonia which is about 0.5% of the amount of oxygen entering into reaction for the formation of the hydroperoxide.

Since the ammonia acts catalytically as an initiator for the reaction, only a catalytic amount is necessary to satisfy that function. However, since the ammonia will combine with any traces of acids formed, thereby destroying its catalytic function, it is preferable that an excess of ammonia over that entering into combination be employed. In general, a minimum of at least 0.5% of the oxygen to be reacted will provide a sufficient excess so that free ammonia is present throughout the entire reaction. The entire amount may be present from the beginning of the reaction or it may be added gradually during the course of the reaction. It is conveniently added along with the oxygen-containing gas if that gas is being recirculated and the amount added may be that sufficient to permit a trace of ammonia in the exit gases. Although a large excess of ammonia is not harmful, a large excess is avoided for economic reasons. In general, over 50% ammonia based upon the oxygen would be considered an objectionable excess.

The oxidation may be carried out either in the presence or absence of an oxidation catalyst. It is preferable, however, to carry out the oxidation in the absence of an oxidation catalyst as shown by the examples. When a catalyst is utilized, nevertheless, high yields of hydroperoxides may be effected provided the amount of catalyst is maintained at a minimum. In general, high hydroperoxide yields may be obtained if the concentration of the catalyst in the oxidation reaction mixture is at any particular instant from about 0.1% to about 0.8%, based on the alkyl-substituted aromatic organic compound. A preferable range on this basis is from about 0.2% to about 0.8%, and a particularly applicable range is from about 0.25% to about 0.5%. Well-known catalysts, such as manganese dioxide, manganese acetate, cobaltous hydroxide, cobaltous acetate, and the like may be used. Oil-soluble catalysts also may be used, for example, catalysts which are soluble in p-cymene, cumene, and diisopropylbenzene. Exemplary are manganese-butyl phthalate and manganese linoleate. Activated carbon may also be used as a catalyst.

In addition to the use of ammonia as an initiator, one may also use other initiators to advantage. For instance, as shown by the examples, those oxidized oils obtained according to the process of this invention and containing appreciable amounts of hydroperoxides are oil-soluble and are, therefore, useful in initiating the oxidation reaction by relieving inhibitions caused by harmful impurities. These oxidized oils, however, do not act as actual oxidation catalysts and are, therefore, highly desirable initiators for those oxidations in which it is desired to obtain optimum yields. When it is desired to speed up the oxidation reaction, these hydroperoxide-rich oils may be used in an amount up to about 50% by weight of the compound to be oxidized. A preferred range is from about 1% to about 20%. It is not essential in the process of this invention, however, that such a reaction initiator be utilized. Other well-known peroxides and hydroperoxides such as acetyl peroxide, benzoyl peroxide, tert-butyl peroxide, tert-butyl hydroperoxide, tetralin hydroperoxide, and the like may also be used in place of the above oxidized oils to act as initiators for the reaction.

The temperature at which the oxidation is carried out depends on the various conditions of reaction, particularly on the presence or absence of a catalyst and the nature of the catalyst. When no catalyst is used, the reaction is too slow at temperatures below about 20° C. and it is advisable in such case to work at a temperature between about 45° C. and about 95° C., preferably between about 60° C. and about 95° C. The reaction proceeds at a convenient rate at a temperature between about 20° C. and about 95° C. when a catalyst is used, and a preferabl range is from about 25° C. to about 60° C. When a catalyst is used, however, the concentration must be kept below 0.8% as pointed out previously. All of the temperatures so far discussed are temperatures as measured at atmospheric pressure. It is possible, however, to obtain high yields of the hydroperoxides after a relatively short period of oxidation by utilization of superatmospheric pressure and temperatures above 95° C. as shown in Example 4. When superatmospheric pressure is used, the temperatures may vary from about 95° C. to about 200° C. The preferable temperature range under these conditions, however, is from about 100° C. to about 130° C., and a particularly applicable range is from about 115° C. to about 120° C. The pressures which are operable in conjunction with temperatures above 95° C. are limited only by equipment design. From a practical standpoint, pressures of from atmospheric to about 500 p. s. i. are feasible. The preferred pressure range is from about 60 p. s. i. to about 200 p. s. i.

The course of the reaction may be followed by determining the refractive index of the oily layer at periodic intervals. With respect to the oxidation of cumene, refractive index values from about 1.4939 to about 1.5116 indicate that from about 10% to about 70% of the original material has been oxidized. The reaction is advisably interrupted within this range of conversion. In the oxidation system of this invention, the refractive indices depend somewhat upon two factors: (1) The nature of the material being oxidized and (2) the nature of the end product. The first of these factors—the compound being oxidized—is of less significance than the other. The nature of the end product is of particular significance when the compound undergoing oxidation has two tertiary carbon atoms, as in the case of diisopropylbenzene. From such a compound there may be prepared either a mono- or a di-hydroperoxide. To obtain the monohydroperoxide, the oxidation is interrupted at a relatively low refractive index, whereas the presence of a substantial amount of a dihydroperoxide is indicated by an appreciably higher refractive index.

Conversion to oxygenated materials of from about 10% to about 70% of the alkyl-substituted aromatic organic compounds previously described may be effected by the process of this invention. It is desirable for the purpose of obtaining a high yield of hydroperoxide to effect conversion of from about 10% to about 30% of the original material inasmuch as undesirable amounts of secondary reaction products, such as the corresponding alcohol or ketone, are formed after this degree of conversion is exceeded.

The method utilized in recovery of the reaction products will vary, depending upon the use to which the hydroperoxide is to be put. If the use of the hydroperoxide does not require separation of the hydroperoxide from other components, such as alcohols, ketones, and unreacted starting material which may be present in the crude reaction mixture, the oily reaction product may be filtered through a layer of some filter aid to remove the catalyst, if any is used, by adsorption, then washed with dilute aqueous alkali and used either as the crude slightly cloudy product for various purposes or after clarification and drying by filtration. The dilute aqueous alkali used in the washing step may be sodium hydroxide, sodium carbonate, sodium bicarbonate, and the like, the concentration of these alkalies in aqueous solution ranging from about 1% to about 10%, but preferably from about 2% to about 5%. If it is desired, however, to obtain a highly concentrated hydroperoxide, the crude reaction product, even without removal of ammonia first, may be stripped of unreacted hydrocarbon by distillation at pressures of about 1 to about 10 millimeters of mercury. This is a particularly important advantage in the use of gaseous ammonia in the process of oxidation because the ammonia tends to stabilize the hydroperoxide. The hydroperoxides themselves may be safely distilled at temperatures below about 100° C., this requiring the use, however, of pressures of about 0.01 to about 1.0 millimeter. $\alpha,\alpha$-Dimethylbenzyl hydroperoxide, for example, may be distilled at 60° C. under a pressure of 0.2 millimeter and at 68° C. under a pressure of 0.3 millimeter. Another method of separating the hydroperoxides from the crude oily reaction product involves precipitation of the hydroperoxide with a concentrated aqueous solution (25% to 40%) of sodium hydroxide. The precipitate is crystalline. The precipitate of $\alpha,\alpha$-dimethylbenzyl hydroperoxide, for example, analyzes for the sodium salt of the hydroperoxide associated with four molecules of water.

The oxidation according to this invention apparently proceeds by a free radical chain mechanism. Using cumene as an example, when this compound is oxidized with molecular oxygen, a hydroperoxide is first formed on the tertiary carbon of the isopropyl group. A very small fraction of this hydroperoxide is then decomposed, resulting in the formation of free radicals which are sufficient to initiate the formation of more hydroperoxide molecules. Oxidation catalysts apparently cause increased amount of hydroperoxide to decompose, thus resulting in an acceleration of the over-all oxidation, but decreasing the amount of undecomposed hydroperoxide at the expense of the formation of secondary products, such as alcohols and ketones. That the oxidation follows a chain mechanism is known by the existence of an induction period, by cases of inhibition, and by the fact that both may be eliminated by the addition of hydroperoxide-rich oils from a previous oxidation run.

The process of this invention is advantageous in that it has been found possible by utilization of ammonia in the oxidizing gas to obtain $\alpha,\alpha$-dialkylarylmethyl hydroperoxides in high yields in a relatively short time and without the formation of substantial amounts of secondary reaction products and the product may be concentrated simply by stripping off the unreacted hydrocarbon from the crude product by distillation. Moreover, ammonia in being soluble to an appreciable extent in the organic compounds being oxidized acts largely as a homogeneous catalyst and prevents undesired acid formation not only in the liquid phase but also in the gaseous phase and in the liquid film on the walls of the reaction vessel. In this respect ammonia even as a neutralizer of acids is superior to inorganic alkalies and may be used without resort to use of any such alkalies.

The expression "gaseous ammonia" as used in this specification and claims is intended to cover uncombined ammonia other than liquid ammonia whether dispersed in the liquid phase or dispersed in the space above the liquid phase. The hydroperoxides formed in the process of this invention are highly useful and find various commercial applications. They are excellent catalysts for the polymerization of vinyl, vinylidene, and vinylene compounds, being, for example, highly useful in the copolymerization of butadiene and styrene to form synthetic rubber. They also are useful in rubber reclaiming, in flotation, and in kier boiling, bleaching, and other textile operations.

What I claim and desire to protect by Letters Patent is:

1. The process of oxidizing an alkyl-substituted aromatic organic compound to a tertiary organic hydroperoxide which comprises contacting said aromatic organic compound in the liquid phase at a temperature in excess of 20° C. with an oxygen-containing gas in the presence of gaseous ammonia, the aromatic organic compound and the tertiary hydroperoxide having, respectively, the structural formulae

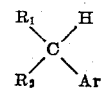

and

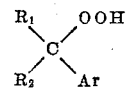

in which $R_1$ and $R_2$ represent alkyl groups and Ar represents a substituent selected from the group consisting of aryl and alkaryl groups.

2. The process of oxidizing an alkyl-substituted aromatic organic compound to a tertiary organic hydroperoxide which comprises contacting said aromatic organic compound in the liquid phase at a temperature in excess of 20° C. with molecular oxygen in the presence of gaseous ammonia, the aromatic organic compound and the tertiary hydroperoxide having, respectively, the structural formulae

and

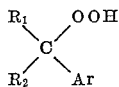

in which $R_1$ and $R_2$ represent alkyl groups and Ar represents a substituent selected from the group consisting of aryl and alkaryl groups.

3. The process of oxidizing an alkyl-substituted aromatic organic compound to a tertiary organic hydroperoxide which comprises contacting said aromatic organic compound in the liquid phase at a temperature in excess of 20° C. with air in the presence of gaseous ammonia, the aromatic organic compound and the tertiary hydroperoxide having, respectively, the structural formulae

and

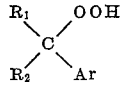

in which $R_1$ and $R_2$ represent alkyl groups and Ar represents a substituent selected from the group consisting of aryl and alkaryl groups.

4. The process of oxidizing an alkyl-substituted aromatic organic compound to a tertiary organic hydroperoxide which comprises contacting said aromatic organic compound in the liquid phase at a temperature in excess of 20° C. with molecular oxygen in the presence of gaseous ammonia in an amount of at least 0.5% of the oxygen to be reacted, the aromatic organic compound and the tertiary hydroperoxide having, respectively, the structural formulae

and

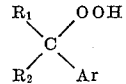

in which $R_1$ and $R_2$ represent alkyl groups and Ar represents a substituent selected from the group consisting of aryl and alkaryl groups.

5. The process of oxidizing an alkyl-substituted aromatic organic compound to a tertiary organic hydroperoxide which comprises contacting said aromatic organic compound in the liquid phase at a temperature in excess of 20° C. with air containing gaseous ammonia in an amount of at least 0.5% of the oxygen of the air to be reacted, the aromatic organic compound and the tertiary hydroperoxide having, respectively, the structural formulae

and

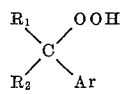

in which $R_1$ and $R_2$ represent alkyl groups and Ar represents a substituent selected from the group consisting of aryl and alkaryl groups.

6. The process of oxidizing an alkyl-substituted aromatic organic compound to a tertiary organic hydroperoxide which comprises contacting said aromatic organic compound in the liquid phase at a temperature in excess of 20° C. with an oxygen-containing gas and gaseous ammonia until at least 1.3 parts oxygen has reacted with 100 parts said organic compound, the amount of ammonia used being at least 0.5% of the oxygen to be reacted, the aromatic organic compound and the tertiary hydroperoxide having, respectively, the structural formulae

and

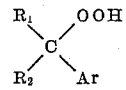

in which $R_1$ and $R_2$ represent alkyl groups and Ar represents a substituent selected from the group consisting of aryl and alkaryl groups.

7. The process of oxidizing cumene to $a,a$-dimethylbenzyl hydroperoxide which comprises contacting cumene in the liquid phase at a temperature in excess of 20° C. with an oxygen-containing gas and gaseous ammonia until at least 1.3 parts oxygen has reacted with 100 parts cumene, the amount of ammonia used being at least 0.5% of the oxygen to be reacted.

8. The proces of oxidizing p-cymene to $a,a$-dimethyl-p-methylbenzyl hydroperoxide which comprises contacting p-cymene in the liquid phase at a temperature in excess of 20° C. with an oxygen-containing gas and gaseous ammonia until at least 1.3 parts oxygen has reacted with 100 parts p-cymene, the amount of ammonia used being at least 0.5% of the oxygen to be reacted.

9. The process of oxidizing p-diisopropylbenzene to $a,a$-dimethyl-p-isopropylbenzyl hydroperoxide which comprises contacting p-diisopropylbenzene in the liquid phase at a temperature in excess of 20° C. with an oxygen-containing gas and gaseous ammonia until at least 1.3 parts oxygen has reacted with 100 parts p-diisopropylbenzene, the amount of amonia used being at least 0.5% of the oxygen to be reacted.

JOSHUA C. CONNER, Jr.

REFERENCES CITED

The following references are of record in the file of this patent:

UNITED STATES PATENTS

| Number | Name | Date |
|---|---|---|
| 2,438,125 | Lorand et al. | Mar. 23, 1948 |
| 2,484,841 | Lorand et al. | Oct. 18, 1949 |

FOREIGN PATENTS

| Number | Country | Date |
|---|---|---|
| 610,293 | Great Britain | Oct. 13, 1948 |